United States Patent [19]

Liebson

[11] Patent Number: 4,929,834
[45] Date of Patent: May 29, 1990

[54] THERMAL MASK FOR CRYOGENIC DETECTORS IN A THERMAL IMAGING DEVICE

[75] Inventor: Wilbur Liebson, Springfield, Va.

[73] Assignee: The United States of America as represented by the Secretary of the Army, Washington, D.C.

[21] Appl. No.: 726,369

[22] Filed: Sep. 20, 1976

[51] Int. Cl.$^5$ .......................... G01J 1/00; G02B 27/00
[52] U.S. Cl. ............................... 250/352; 350/276 SL
[58] Field of Search .................................. 250/330–334, 250/338, 341, 352, 526; 350/205, 276 SL; 343/18 E

[56] References Cited

U.S. PATENT DOCUMENTS

| | | | |
|---|---|---|---|
| 3,648,056 | 3/1972 | Buttweiller et al. | 250/239 |
| 3,908,457 | 9/1975 | Drong et al. | 250/338 |
| 3,984,157 | 10/1976 | Le Vantine | 350/276 SL |
| 4,011,452 | 3/1977 | Meyers | 250/352 |

*Primary Examiner*—Stephen C. Buczinski

[57] ABSTRACT

A counter-countermeasure provided within a thermal imgaging device (TID) wherein an enemy black hole, or cold spot, radiometer (BHR) is prevented from detecting the presence of cryogenic detectors within the TID. The thermal imager counter-countermeasure comprises a beam splitter placed in the primary optical path of the TID and a projection heater positioned to one side of the primary optical path and at, or close to, the same point as the array of cryogenic detectors. In operation, heat radiation from the projection heater, which is referenced to an ambient temperature source in proximity to the TID, is reflected off the beam splitter at the same cross-sectional geometrical area as the cold spot radiation (or absence of heat radiation) from the cryogenic detectors is transmitted through the beam splitter such that when a potential enemy BHR has our TID in its field-of-view (FOV), the cold spot radiation will be masked by heat radiation and thus the cold spot radiation will not be present for detection by the potential enemy BHR.

The invention described herein may be manufactured, used, and licensed by the government for governmental purposes without the payment of any royalties thereon.

10 Claims, 2 Drawing Sheets

THERMAL MASK FOR CRYOGENIC DETECTORS IN A THERMAL IMAGING DEVICE

BACKGROUND OF THE INVENTION

The general area of technology of the present invention is in electronic warfare, and specifically in the electro-optical counter-countermeasure used in our thermal imaging device (TID) to prevent a potential enemy black hole radiometer (BHR) from locating our TID by receiving a response from their BHR when an object colder than the expected ambient, such as the cryogenic detectors within our TID, is in the BHR field-of-view (FOV).

It is known that the BHRs may be modified from normally detecting objects hotter than ambient temperatures into producing a positive response whenever an object colder than the expected ambient temperature is in the BHR FOV. These modifications mean that potential enemy BHRs can detect our TIDs that are used in surveillance of their troop movements, troop build-ups, etc by sensing our cryogenic detectors within the TID.

The problem of our surveillance TIDs being detected and located by the enemy BHRs is solved by the present invention.

SUMMARY OF THE INVENTION

The present invention relates to a projection, or masking, heater and beam splitter working in conjunction with each other inside a TID for masking, or combining with, the absence of heat that is caused by the cryogenic detectors.

The optics of a TID generally form a primary optical path comprising an infrared (IR) lens which focuses scene energy onto a cryogenic detector array in which a scan mirror between the lens and detectors sweeps the focused scene radiation across the detector array. A BHR looks at the cryogenic detectors through the same TID optics in the process of detecting the cooled detectors and thus locating the TID.

The present invention comprises a stationary beam splitter, which is placed at an angle, of say about 45°, to the scene radiation in the optical path between the cryogenic detectors and the scan mirror, and a projection heater having a size the same as the cryogenic detector array that is placed off to one side of the beam splitter and at, or close to, the same focal point as the focal point of the cryogenic detectors. The efficiency of the system is generally better when the detectors and heater are at the same focal point. However, factors may be presented that dictate placing either or both at a place other than at their focal points.

The projection heater radiates heat over an area of the stationary beam splitter and is reflected out the primary optical path in the same geometrical size and with the same amount of radiation that equally offsets the absence of head radiation from the cryogenic detectors out the primary optical path. The beam splitter may be about 90%–95% transmissive and 10%–5% reflective. A radiation trap is positioned on the opposite side of the beam splitter from the projection heater and absorbs all of the stray heat radiance to prevent the cryogenic detectors from being affected.

The preferred embodiment will be better understood with reference to the following drawings.

DETAILED DESCRIPTION OF THE PREFERRED EMBODIMENT

Figure 1:
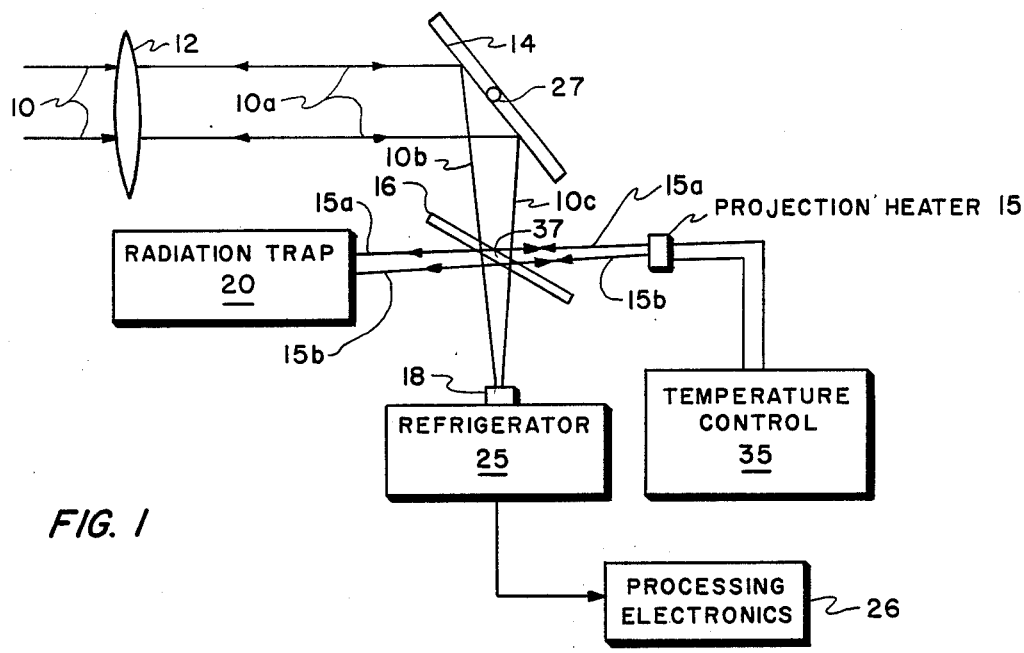
FIG. 1 is a schematic diagram illustrative of the thermally masked TID of the present invention.

Refer now to FIG. 1 for an explanation of the present invention. Scene, or target, radiation 10 is focused by an optical means comprising IR lens 12 and scanning mirror 14 onto an array of cryogenic detectors 18. Lens 12 and scanning mirror 14 form a primary optical path for radiation 10 to cryogenic detectors 18. Scanning mirror 14, which moves about its scan axis 27, scans the incoming scene radiation 10a back and forth, represented as outer extremity beams 10b and 10c, across the cryogenic detectors 18. The cryogenic detectors 18 are cooled by a refrigerator 25, and have an output therefrom into some processing electronics 26, such as a pre-amplifier, an amplifier, and a display. This is the conventional arrangement for the present day TIDs.

The invention lies in thermally masking the primary optical path, comprised of beams 10b and 10c, to balance out the cold spot radiance emitted by cryogenic detectors 18 back out through IR lens 12. Otherwise, enemy BHRs may readily locate our TIDs by detecting the cryogenic detectors within the TIDs.

Figure 2:
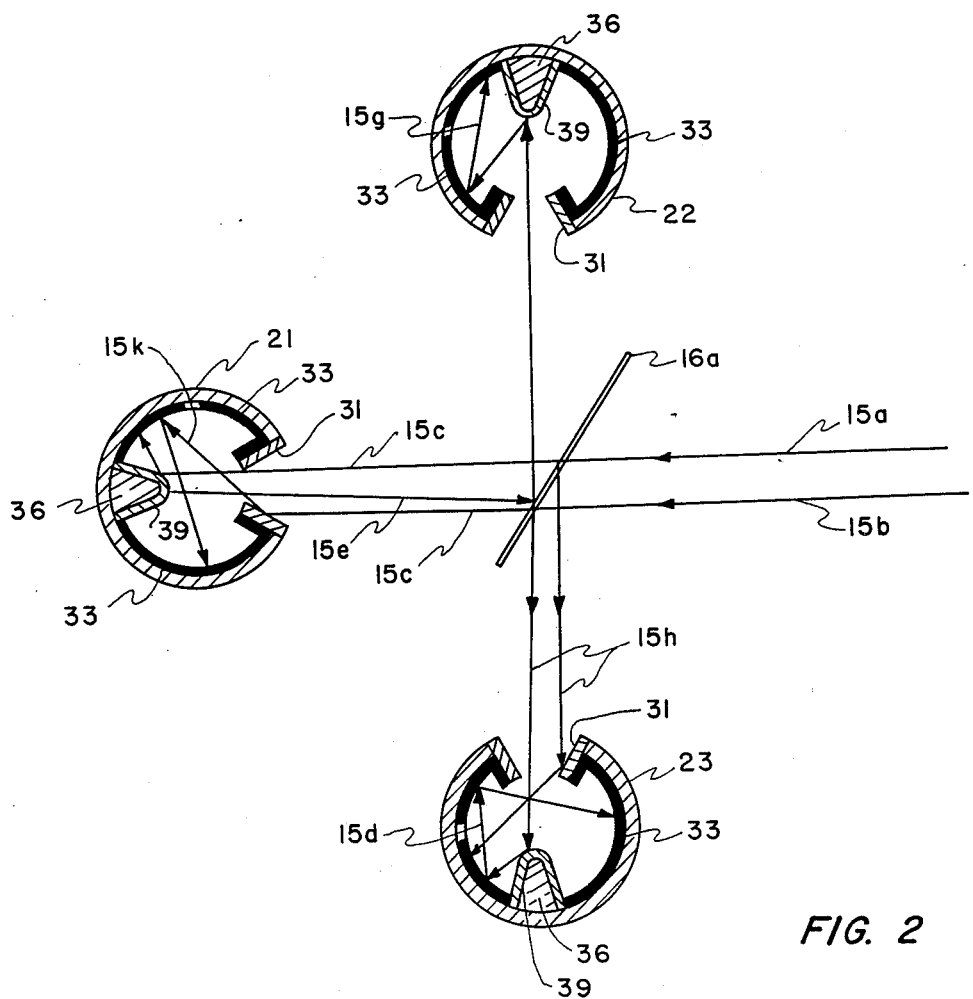
FIG. 2 further illustrates a possible radiation trap of the present invention.
Figure 3:
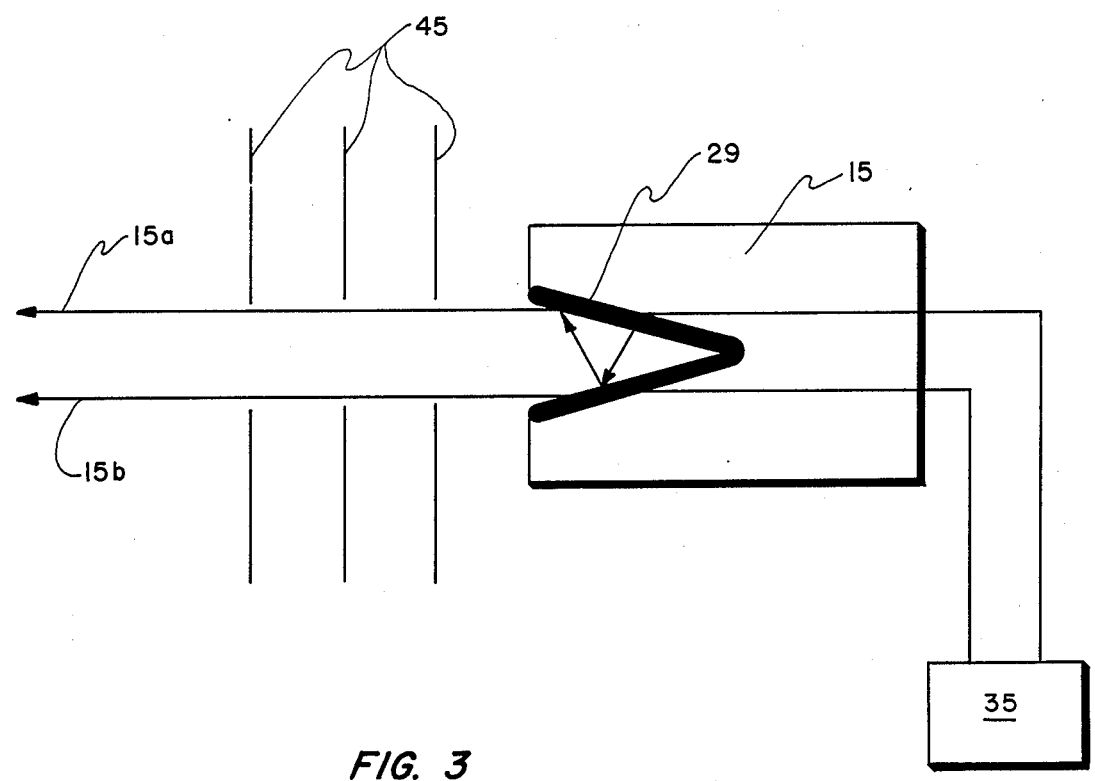
FIG. 3 illustrates an embodiment of a projection heater of the present invention.

Refer to FIGS. 1, 2 and 3 for an explanation of hour out TID is thermally masked. A beam splitter 16 is rigidly positioned in the primary optical path at some distance between scanning mirror 14 and cryogenic detectors 18. The beam splitter 16 may be something like 90% transmissive and 10% reflective, or 95% transmissive and 5% reflective, but is not limited to that amount. There is a consideration of these percentages however in regard to the amount of heat emitted from a small projection heater 15 and the efficiency of radiation trap 20. This consideration will be discussed later.

Beam splitter 16 is placed at about a 45° angle to the primary optical path having scene radiation represented by beams 10b and 10c. Projection heater 15 is positioned on one side of beam splitter 16 looking back toward scene. Heat radiation, having outer extremities represented as beams 15a and 15b, is reflected back out the primary optical path, with outer extremity beams 15a and 15b geometrically matching the scene radiation beams 10b and 10c. One reason that these outer extremity beams match may be that projection heater 15 and the cryogenic detectors 18 are the same distance from the beam splitter 16. However, heater 15 may be either closer or farther away from beam splitter 16 and thus does not have to be the same size as the size of the plurality of cryogenic detectors 18 to geometrically match the cross-section of cold spot radiation, represented by 10b and 10c, with the heat radiation 15a and 15b. The temperature of radiation emitted from heater 15 is controlled by a temperature control source 35. The temperature control source 35 may be some ambient source, such as the metal part of some surrounding structure, such as the TID housing, wherein the metal part of the structure is thermally connected direct to a black layer 29 radiation source on the inside of heater 15, as shown by FIG. 3. The heat radiation is generated in the black layer 29. The layer of black material 29 is laid on the inside of a v-notched groove in heater 15, and is projected out as the above noted heat radiation 15a and 15b through a series of baffles 45 to concentrate the heat radiation on a cross-sectional area, represented by numeral 37, on the beam splitter. Optical means may also be used instead of the baffles 45 for concentrating the heat radiation on area 37. Area 37 is defined (in one dimension) by the outer limits at beams 15a and 15b. This same area 37 size is defined (in one demension) by scene radiation, or cold spot radiation, at the outer limits 10b and 10c. Area 37 is made to be the same size for the heat radiation as for the cold spot radiation emitted from the array of cryogenic detectors 18 by proper shaping of the v-notch in heater 15 and by using appropriate size baffles 45 or optics. It is found that an ambient temperature source, such as the metal part of a surrounding structure, can present an ambient temperature radiance reflected from area 37 that will satisfactorily mask the cold spot radiation from detectors 18. Electrical means may also be used as the temperature control source 35 for providing more or less heat radiation from heater 15 as appropriate to absolutely mask the cold spot radiation. Even though the projection heater 15 is discussed herein above as being a black layer in a v-notched body, other heater means may be used. For example, a simple detector or tungsten strip, whose particular size generates heat radiation of the same cross-sectional area on the beam splitter 16 as the cold spot radiation from cryogenic detectors 18, may be connected directly to the housing structure of the TID and have the proper temperature control means for masking the cryogenic detectors 18.

Heat radiation 15a and 15b, for all practical purposes, is considered to travel in only one direction through beam splitter 16, i.e. it moves from right to left as shown in FIG. 1. The reason for this is better illustrated with reference to FIG. 2. Assume beam splitter 16 is 90% transmissive and 10% reflective, 90% of heat radiation 15a and 15b enters a radiation trap 20 and is entirely dissipated therein while 10% of the heat radiation is reflected off area 37 of beam splitter 16 and out the primary optical train, or in other words reflected off scanning mirror 14 and out through IR lens 12. The radiation trap 20 may comprise, but is not limited to, a plurality of spherical cavity radiation traps, shown by numerals 21, 22, and 23 in FIG. 2. These radiation traps may take the form of spherical bodies having internal cavities with an inward pointing conical front surface having a reflective surface for guiding the heat radiation through an aperture at the center of the cone and on into the inside cavities. A silvered layer 31 is placed on the reflective surface to enhance reflectance of heat radiation through the aperture. The cavity walls have a layer of absorbing black 33 thereon to absorb the heat radiation. A conical back section 36 is positioned at the back of the cavity projecting out toward and facing the aperture of the inward pointing conical front surface. Cone 36 has a layer of silver 39 on the outside to direct incoming heat radiation about the inside cavity absorbing black material 33 to dissipate the heat radiation therein. A beam splitter 16a is placed at about a 45° angle with the incoming heat radiation 15a and 15b. Beam splitter 16a is assumed to also be 90% transmissive and 10% reflective. Therefore unit trap 21 receives 90% of the heat radiation, shown numerically as 15c, and unit trap 23 receives 10% of the heat radiation, shown numerically as 15h. However, should some of the radiation be reflected back out the aperture of trap 21 toward beam splitter 16a, which reflected radiation being shown numerically as 15e, then a third unit trap 22 will receive 10% of this returning radiation 15e as radiation 15f while 90% is returned back through beam splitters 16a and 16 to projection heater 15. The internally reflected heat radiation 15k, 15g and 15d represents the dissipated heat radiation within the unit traps 21, 22 and 23 respectively. Essentially no heat radiation is seen by detectors 18. Baffles may also be used with the unit traps. However, whether baffles are used or not, a series of beam splitters, unit traps, filters, etc may be used to keep all heat radiation from the cryogenic detectors 18.

Obviously modifications of the present invention are possible in light of the above teaching and it is therefore to be understood that within the scope of the appended claims the invention may be practiced otherwise than as specifically described.

I claim:

1. A thermal mask for masking radiation from cryogenic detectors comprising in a thermal imaging device:
   an array of cryogenic detectors;
   optical means comprising a primary optical path for focusing infrared radiation from a scene onto said array of cryogenic detectors;
   a beam splitter positioned in said primary optical path in front of said array of cryogenic detectors;
   a temperature control means;
   a projection heater for generating heat radiation therefrom that is temperature controlled by said temperature control means, wherein said projection heater is positioned to one side of said beam splitter at a distance from said beam splitter that is about the same as the distance of said array of cryogenic detectors from said beam splitter and further wherein the physical size of a heater surface which emits heat radiation from said projection heater is about the physical size of said array of cryogenic detectors whereby said heat radiation from said projection heater is projected onto said beam splitter in a geometrical size that masks cold spot radiation from said array of cryogenic detectors that is projected onto said beam splitter; and
   a radiation trap positioned on the opposite side of said beam splitter from said projection heater wherein said radiation trap receives and completely dissipates the portion of said heat radiation that is transmitted through said beam splitter and wherein the remaining portion of said heat radiation is reflected off said beam splitter along the same cross-sectional area of said primary optical path as the cross-sectional area of said cold spot radiation along said primary optical path for masking said cold spot radiation from any black hole radiometer capable of detecting said cold spot radiation.

2. A thermal mask as set forth in claim 1 wherein said optical means comprises an infrared lens for focusing scene radiation onto said array of cryogenic detectors and said projection heater and a scanning mirror between said infrared lens and said array of cryogenic detectors for scanning said scene radiation over said array of cryogenic detectors and said projection heater.

3. A thermal mask as set forth in claim 2 wherein said beam splitter is placed at a 45° angle with said primary optical path wherein said scene radiation is looking at both of said projection heater and said array of cryogenic detectors.

4. A thermal mask as set forth in claim 3 wherein said projection heater heated surface comprises a body with a v-notched groove having a layer of black material therein wherein said v-notched groove faces said beam splitter through a plurality of baffles.

5. A thermal mask as set forth in claim 4 wherein said temperature control means comprises an ambient temperature source wherein said ambient temperature source is connected directly to said layer of black material.

6. A thermal mask as set forth in claim 5 wherein said radiation trap comprises a plurality of spherical cavity radiation traps and a plurality of beam splitters for guiding said heat radiation into said plurality of spherical cavity radiation traps.

7. A thermal mask as set forth in claim 6 wherein said plurality of spherical cavity radiation traps comprise an inward pointing conical front surface having a reflective layer of silver thereon and an aperture at the center of the cone wherein heat radiation is guided into the cavity, said cavity having a layer of absorbing black material on the inside walls and a conical back surface projecting out from the back of the cavity toward said aperture wherein said conical back surface has a reflective layer of silver thereon for directing incoming heat radiation about the inside walls of said cavity to dissipate and trap said heat radiation within said plurality of spherical cavity radiation traps.

8. A thermal mask as set forth in claim 7 wherein said beam splitters are 95% transmissive and are 5% reflective.

9. A thermal mask as set forth in claim 3 wherein said projection heater and said temperature control means are combined and comprise a nichrome strip connected directly to the housing of said thermal imaging device.

10. A thermal mask as set forth in claim 3 wherein said projection heater and said temperature control means are combined and comprise a tungsten strip connected directly to the housing of said thermal imaging device.

* * * * *